United States Patent
Jansen-Troy et al.

(10) Patent No.: US 12,552,047 B2
(45) Date of Patent: Feb. 17, 2026

(54) HANDLING TOOL FOR MEDICAL EQUIPMENT

(71) Applicant: Aesculap AG, Tuttlingen (DE)

(72) Inventors: Arne Jansen-Troy, Stockach (DE); Allan Maas, Constance (DE); Daniel Kiessling, Villingen-Schwenningen (DE); Matthias Henke, Villingen-Schwenningen (DE)

(73) Assignee: Aesculap AG, Tuttlingen (DE)

( * ) Notice: Subject to any disclaimer, the term of this patent is extended or adjusted under 35 U.S.C. 154(b) by 0 days.

(21) Appl. No.: 19/104,306

(22) PCT Filed: Aug. 18, 2023

(86) PCT No.: PCT/EP2023/072804
§ 371 (c)(1),
(2) Date: Feb. 17, 2025

(87) PCT Pub. No.: WO2024/041997
PCT Pub. Date: Feb. 29, 2024

(65) Prior Publication Data
US 2025/0256408 A1    Aug. 14, 2025

(30) Foreign Application Priority Data
Aug. 22, 2022   (DE) .................... 10 2022 121 160.6

(51) Int. Cl.
*B25J 15/00*    (2006.01)
(52) U.S. Cl.
CPC ....... *B25J 15/0014* (2013.01); *B25J 15/0023* (2013.01)

(58) Field of Classification Search
CPC ............... B25J 15/0014; B25J 15/0023; A61B 2050/006; A61B 50/30; A61B 50/20
See application file for complete search history.

(56) References Cited

U.S. PATENT DOCUMENTS

| 6,039,375 A * | 3/2000 | Bauman | B25J 15/0253 901/31 |
| 6,592,324 B2 * | 7/2003 | Downs | B25J 17/0208 414/730 |

(Continued)

FOREIGN PATENT DOCUMENTS

| CN | 1447175 A | 10/2003 |
| CN | 215618131 U | 1/2022 |

(Continued)

OTHER PUBLICATIONS

Search Report received in German Application No. 10 2022 121 160.6 dated Jun. 22, 2023, with translation, 9 pages.

(Continued)

*Primary Examiner* — Stephen A Vu
(74) *Attorney, Agent, or Firm* — Christopher A. Rothe; CM Law (57) ABSTRACT

A handling tool is configured for gripping and/or handling medical equipment, preferably a container, more preferably a sterilization container. The handling tool includes a carriage and two prongs that are spaced apart in parallel and extend in a longitudinal direction at a right angle away from the carriage. Each prong has a container-placement/grasping side, on which a number of receiving projections, which are spaced apart longitudinally, are formed or arranged. The projections extend in a vertical direction with respect to the container-placement/grasping side. A system includes the medical handling tool and a medical container.

19 Claims, 5 Drawing Sheets

(56) References Cited

U.S. PATENT DOCUMENTS

| | | | |
|---|---|---|---|
| D552,138 S * | 10/2007 | Kondo | D15/199 |
| 7,616,289 B2 * | 11/2009 | Chae | B65G 49/061 |
| | | | 349/187 |
| 8,376,428 B2 * | 2/2013 | Rebstock | B25J 15/0014 |
| | | | 294/902 |
| 9,618,857 B2 * | 4/2017 | Volkov | G03F 7/70741 |
| 10,639,800 B2 * | 5/2020 | Kamranzadeh | B65G 61/00 |
| 2016/0151123 A1 | 6/2016 | Thomas et al. | |
| 2017/0173789 A1 | 6/2017 | Kilibarda et al. | |
| 2020/0016770 A1 | 1/2020 | Kamranzadeh et al. | |
| 2020/0214548 A1 | 7/2020 | Larsson | |

FOREIGN PATENT DOCUMENTS

| | | |
|---|---|---|
| DE | 8213349 U1 | 9/1982 |
| DE | 8609871 U1 | 7/1986 |
| DE | 102015215815 A1 | 2/2017 |
| DE | 102019128592 A1 | 4/2021 |
| GB | 2591071 A | 7/2021 |
| WO | 2021018649 A1 | 2/2021 |

OTHER PUBLICATIONS

Search Report received in International Application No. PCT/EP2023/072804 dated Nov. 23, 2023, with translation, 6 pages.
Office Action received in Chinese Application No. 202380060257.3 dated Oct. 31, 2025, with translation, 6 pages.
Search Report received in Chinese Application No. 202380060257.3 dated Oct. 17, 2025, with translation, 5 pages.

* cited by examiner

HANDLING TOOL FOR MEDICAL EQUIPMENT

CROSS-REFERENCE TO RELATED APPLICATIONS

This application is the United States national stage entry of International Application No. PCT/EP2023/072804, filed on Aug. 18, 2023, and claims priority to German Application No. 10 2022 121 160.6, filed on Aug. 22, 2022. The contents of International Application No. PCT/EP2023/072804 and German Application No. 10 2022 121 160.6 are incorporated by reference herein in their entireties.

FIELD

The present disclosure relates to a handling tool for handling a medical equipment/product/object, in particular a medical container, and a system comprising the handling tool and the medical container.

BACKGROUND

Medical containers such as sterile goods containers, sieve baskets with soft packaging and the like are already handled automatically. Such handling is carried out using parallel or serial robots with corresponding manipulators, industrial trucks, AGVs (Automated Guided Vehicles), conveyor belts and conveyors, elevator systems and other conveyor technologies widely used in logistics.

In many cases, highly automated AEMPs (reprocessing unit for medical devices) use a carrying device in the form of a tray on which the object or product to be moved is located. This enables safe handling regardless of the geometry of the object or product. The disadvantage, however, is that the trays represent additional costs, cleaning and logistics effort.

If objects in the form of sterile goods containers are handled directly, this has so far been done with a shovel-like tool that moves under the base of the object. The disadvantage here is that an additional mechanism has to be used to lift the object in order to place the shovel-like tool under the object. Gripping from a table top and/or from a rack and/or from a container transport cart is not possible with this tool, since the object may be displaced by the shovel-like tool before the object rests on the shovel surface. Furthermore, the shovel-like tool limits the maximum moving/handling speed at which the object cannot slip.

In general logistics applications, forklift trucks or lifting devices with flat fork arms have become established for such applications, which are spaced parallel and thus span a theoretical support plane. However, the disadvantage of such flat fork arms is that lifting openings for receiving the fork arms have to be configured in the base of the object to be transported, which reduces the usable internal volume of the object. Alternatively, the item (object) to be lifted has to be placed on a pallet, which needs to be profiled for the fork arms to pass underneath. Furthermore, the maximum moving/handling speed at which the object can be prevented from slipping is limited by fixing the object to the fork arms based solely on frictional connection, unless the object is additionally secured against slipping, which would again be costly.

SUMMARY

Accordingly, the object of the present disclosure is to eliminate or at least reduce the disadvantages of the prior art. Specifically, the object of the present disclosure is to provide a handling tool for objects to be handled, in particular medical equipment, which enables the object to be gripped or picked up from any surface or independently of the positioning of the object as well as a high handling speed of the object, in particular in the case of automated handling.

At this point, the term 'gripping' is to be understood in a very general sense and is not limited to a pincer-shaped grip with which an object is clamped between two branches, but also any type of picking up, i.e. also simply (loosely) gripping under an object, in which only a force is applied to the object in the lifting direction or the engagement in corresponding receptacles on the object, in which only a lifting force is applied to the object but at the same time lateral slipping of the object can be prevented by corresponding guides.

Specifically, the object is solved by the preferably medical handling tool, which is provided and configured for gripping and/or handling medical equipment/a medical object/product/item, preferably a medical container, further preferably a sterilization container, with a fork carrier and two parallel-spaced fork arms extending in a longitudinal direction perpendicularly away from the fork carrier and each of which has a container-placing side/grasping side on which a number of longitudinally-spaced receiving projections are configured or arranged, which extend in a (positive) height direction (i.e. upward) to the container-placing side/grasping side.

In other words, the handling tool includes the fork carrier, which extends essentially symmetrically, starting from a center position, in a positive and in a negative width direction. A respective fork arm is configured at each end portion of the fork carrier in the width direction, wherein each fork arm extends away from the fork carrier in the positive longitudinal direction. In yet other words, the fork carrier and the two fork arms essentially form a U-shape, wherein the medical equipment to be handled is essentially received in a receptacle space configured between the fork arms.

The fork arms contain the receiving projections, which extend away from the fork arms in the height direction. The height direction is understood to be a direction that is essentially normal to a plane spanned by the longitudinal direction and the width direction. The receiving projections are separated from each other by notches. Preferably, at least two receiving projections are configured per fork arm. Preferably, in a global coordinate system, an extension of the fork carrier is greater in the height direction than in the longitudinal direction. Further preferably, in the global coordinate system, an extension of the fork arm in the height direction is greater than in the width direction.

Accordingly, the core of the disclosure is the handling tool consisting of the fork carrier and the two fork arms, wherein the fork arms are each configured with the receiving projections (extending upward).

By forming the fork arms with the receiving projections, form-fitting receiving/locking of the medical equipment to be handled on the fork arms can be achieved, whereby an increase in handling speed can be achieved with a simultaneous increase in handling safety.

In a first aspect, the receiving projections of the fork arms may be configured to be tapered, in particular wedge-shaped, such that a height extension of the receiving projections in the height direction on sides of the fork arms facing each other is greater than a height extension of the receiving projections in the height direction on sides of the fork arms facing away from each other.

In other words, the receiving projections of the fork arms may taper toward each other in the height direction, in particular with respect to an extension in a width direction, which corresponds to an extension direction of the fork carrier.

In yet other words, the receiving projections may have a ramp geometry whose height increases in the direction of the receptacle space configured between the fork arms. The ramp geometry may preferably have an essentially linear contour. Alternatively, the ramp geometry may have a (partially) parabolic contour.

Such a configuration of the receiving projections of the fork arms may improve the engagement process of the fork arms in the medical equipment to be handled by the handling tool. Furthermore, manufacturing tolerances, positioning tolerances, and/or distortion of the medical equipment to be handled can be compensated by such a configuration. In addition, such a geometry may achieve self-locking of the (latching) connection between the receiving projections and the medical equipment to be handled.

In a further aspect, the fork arms may include an underside that faces away from the container-placing side/grasping side and on which manipulation projections are configured or arranged, which extend in a depth direction/negative height direction to the underside and which are preferably configured in a tapered, in particular wedge-shaped, manner such that a height extension of the manipulation projections in the height direction on the sides of the fork arms facing each other is smaller than a height extension of the manipulation projections in the height direction on the sides of the fork arms facing away from each other.

In other words, the fork arms may include the underside that faces away from the container-placing side/grasping side and on which the manipulation projections are configured or arranged, which extend in a depth direction to the underside and which preferably taper away from each other in a negative height direction, in particular with respect to an extension in the width direction.

In other words, the fork arms may include the manipulation projections extending in a negative height direction away from the fork arms. The manipulation projections may preferably have a ramp geometry whose extension in the negative height direction slopes toward the receptacle space configured between the fork arms. The ramp geometry may preferably have an essentially linear contour. Alternatively, the ramp geometry may have a (partially) parabolic contour.

The manipulation projections make it possible to manipulate a position or to push or pull the medical equipment to be handled when the medical equipment is not located between the fork arms.

In a further aspect, manipulation projections may be configured to be rotationally symmetrical, in particular rotationally symmetrical by 180°, with respect to the receiving projections, relative to a central axis of the fork arms extending in the longitudinal direction of the fork arms.

In other words, the contour of the manipulation projections may correspond to the contour of the receiving projections in a 180° rotated state.

By such a configuration of the manipulation projections, the manipulation projections may hook/latch in a manner corresponding to that of the receiving projections in the medical equipment to be handled in order to push or pull the medical equipment. Specifically, such manipulation projections enable hooking/latching such that only one of the fork arms is engaged with the associated manipulation projections when the handling tool is rotated 180° from an original position.

In a further aspect, the handling tool may include a sensor recess, preferably in/on the fork carrier.

In other words, a notch or the like, which is configured to accommodate a sensor, may be configured on the handling tool. The sensor may be an optical and/or radio-based and/or ultrasound-based sensor, which is suitable for recognizing the objects to be handled, in particular medical equipment, for example via a tag/marking.

Alternatively or additionally, the handling tool may include the sensor recess on at least one fork arm.

Such a configuration of the handling tool makes it possible to accommodate the above sensor in/on the handling tool. Such a sensor supports the detection of an in particular relative position of the medical equipment in relation to the handling tool, which enables automated and computerized defined movement of the handling tool.

In a further aspect, a distance between the two fork arms may be variable, preferably continuously variable.

In other words, the fork arms may be movable relative to the fork carrier in the width direction, i.e. in the direction in which the fork carrier extends. Preferably, the fork arms may be movable via at least one threaded rod, or at least one hydraulic cylinder, or at least one pneumatic cylinder.

By configuring the handling tool in this way, the handling tool may be flexibly adapted to a variety of medical equipment, which considerably increases the range of applications for the handling tool.

In a further aspect, at least one of the fork arms may include a latching element/latching geometry, preferably a hook, on an end portion facing away from the fork carrier.

In other words, the handling tool is configured on at least one of the fork arms, but advantageously on both fork arms, with the latching element, which enables form-fitting engagement in a preferably cylindrical element. Specifically, the latching element enables form-fitting engagement in a cylindrical object in particular, which is ideally aligned parallel to the fork carrier. The object may be, for example, a handle and/or an interface and/or an eyelet of a (medical) sieve basket, a (medical) wire frame, a box or the like.

In a further aspect, at least one of the fork arms may be configured with at least one clamping element, preferably a pneumatic cushion.

In other words, on at least one of the fork arms, but preferably on both fork arms, the clamping element may be configured in the direction of the receptacle space configured between the fork arms, which is configured to establish a force-fit connection to the medical equipment to be handled. Preferably, the clamping element may be configured as a pneumatic or hydraulic cushion, which expands when pressure is applied and exerts a clamping force on the products to be gripped.

By configuring the fork arms with at least one clamping element, the products to be gripped, preferably in the form of medical equipment, may be prevented/stopped from slipping. This is particularly advantageous for heavy products to be gripped, such as heavily loaded sterile goods containers, in order to securely fix the products to be gripped in/on the handling tool when the handling tool changes direction.

In a further aspect, the fork arms may have a truss structure (lightweight structure).

In other words, the fork arms and/or the fork carrier may be configured with a load-compatible geometry with weight-reducing recesses, wherein unloaded regions may be configured without material or with reduced wall thickness.

The weight of the handling tool may be reduced by configuring the fork arms and/or the fork carrier in this way.

The handling speed can be increased due to the lower weight or the resulting lower inertia of the handling tool.

In a further aspect, the fork carrier may include an interface of a robotic system on a portion facing away from the fork arms.

In other words, the handling tool may be connected/connectable to the robotic system via the fork carrier via the interface, which is configured in the form of a flange, for example. The interface may be configured on the fork carrier in such a way that it is arranged centrally between the fork arms in the width direction.

In a further aspect, the interface may be a pivotable/rotatable interface such that the handling tool can be rotated about a center axis of the interface which is oriented parallel to the longitudinal direction.

The handling tool may also be configured from a fiber-reinforced or glass-bead-reinforced plastic. Alternatively, the handling tool may be configured from a metallic material.

In a further aspect, the handling tool may be configured by machining, layering (composite plastic), injection molding, or rapid prototyping (additive manufacturing).

In a further aspect, the fork arms may include a chamfer on an end portion facing away from the fork carrier. Such a chamfer makes it easier to insert the fork arm between products to be gripped that are positioned closely to each other and/or prevents the fork arms from getting caught. Furthermore, the chamfer may save material and thus weight, which reduces mechanical stress.

In a further aspect, the fork arms may each include a stop, preferably in the form of a radius, on a portion adjacent to the receptacle space configured between the fork arms.

In a further aspect, the receiving projections may be configured in a crenellated shape on the fork arms.

In a further aspect, the fork carrier may be configured in one piece of material with the fork arms (integral configuration). Alternatively, the fork arms may be form-fittingly and/or force-fittingly connected to the fork arms (modular configuration).

The object is further solved by a system comprising the handling tool, preferably according to one of the above aspects, and by a medical container, wherein the medical container includes at least one fold and the fork arms are provided and configured to contact and/or fix the fold of the medical container in a form-fitting manner via the receiving projections and/or the manipulation projections.

In other words, the system includes the handling tool and the medical container, preferably in the form of the sterile goods container. The geometry of the receiving projections and/or of the manipulation projections is adapted to a geometry of the fold of the medical container. In other words, the receiving projections and/or the manipulation projections are configured in such a way that they engage in the in a fold form-fitting manner.

In one aspect, the medical container may have a base area with dimensions A×B, and A may be a multiple of 1/3 of a length of the fork arm in the longitudinal direction.

In other words, the length of the fork arm may be matched to the dimensions of the medical container in a defined ratio.

By configuring the fork arms in this way, a large number of different medical containers or medical containers of different sizes can be handled using the handling tool. In particular, sterile goods containers with a length of 1/1, 3/4 and 1/2 can be handled with the handling tool.

In one aspect, the fold may be symmetrically configured on opposite side walls of the medical container.

In a further aspect, the fold may be oriented parallel to a bottom and/or to an edge of the medical container.

In a further aspect, the fold may be configured in a portion of the medical container facing an opening of the medical container. In other words, the fold may be configured in a height direction in an upper portion of the medical container.

In a further aspect, the fold may form an edge portion of the opening of the medical container.

DETAILED DESCRIPTION

In the following, configuration examples of the present disclosure are described on the basis of the associated Figures. In the following, 'top or upper side' is understood to mean a higher value in the Z direction/height direction. In the following, 'bottom or underside' is understood to mean a lower value in the Z direction/height direction. In the following, 'front' is understood to mean a higher value in the X direction/longitudinal direction. In the following, 'rear' is understood to mean a lower value in the X direction/longitudinal direction.

First Configuration Example

Figure 1:
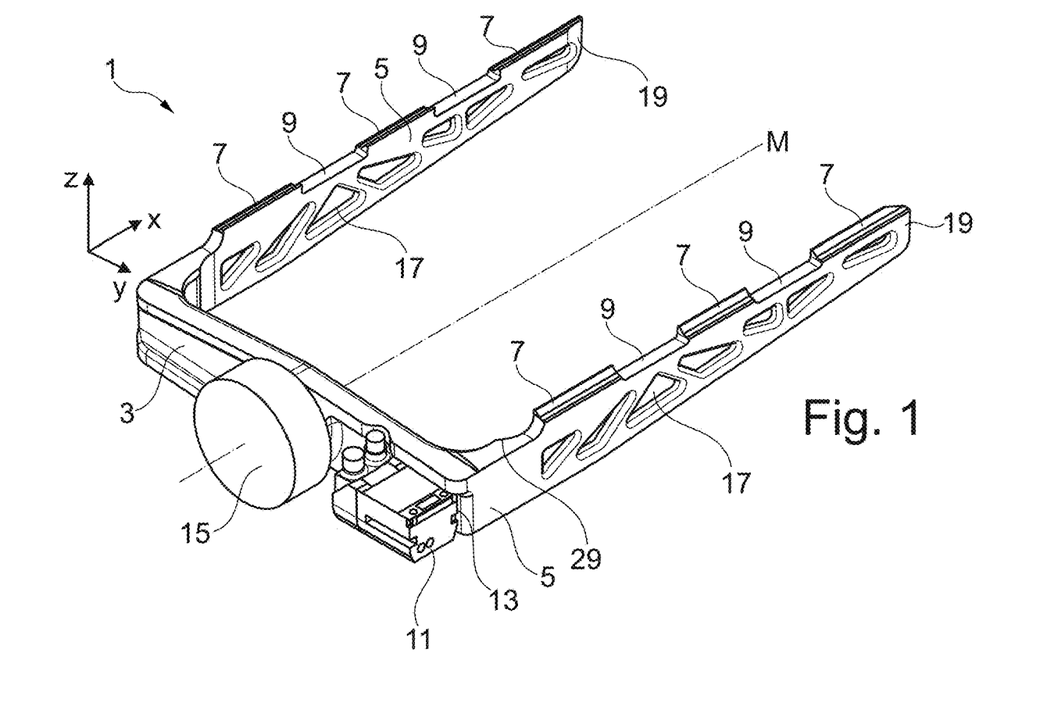
FIG. 1 is a representation of a handling tool according to a first configuration example of the present disclosure.

FIG. 1 shows a perspective view of a handling tool 1 according to the disclosure in a first configuration example. The handling tool 1 includes a fork carrier 3, which in the first configuration example shown here is configured as a double-T carrier and extends in a width direction Y. A respective fork arm 5 is configured at each end portion of the fork carrier 3, wherein each fork arm extends perpendicularly away from the fork carrier 3 in a longitudinal direction X. The two fork arms 5 are configured to be parallel. The fork carrier 3 and the two fork arms 5 essentially form a U-shape. Receiving projections 7 are configured on an upper side or on a container-placement side/grasping side of the fork arms 5. The receiving projections 7 are interrupted along the longitudinal direction X by notches 9. In other words, an extension of the fork arms 5 in a height direction Z, which is oriented normal to a plane spanned by the longitudinal direction X and the width direction Y, is increased in regions of the receiving projections 7.

A sensor 11 is configured in a sensor recess 13 on one side of the fork carrier 3 facing away from the fork arms 5. An interface 15 of a robotic system (not shown) is furthermore configured on the side of the fork carrier 3 facing away from the fork arms 5. The interface 15 is provided and configured to move the handling tool 1 in space and to rotate it about an axis M. The fork arms 5 include recesses 17, which are configured to reduce the weight of the handling tool 1. Due to the recesses 17, the fork arms 5 have a suitably load-bearing truss geometry. Furthermore, the fork arms 5 each contain a chamfer 19 on an end portion facing away from the fork carrier 3.

In the first configuration example shown here, the fork carrier 3 and the two fork arms 5 are configured in one piece. Embodiments in which the fork arms 5 are firmly or detachably connected to the fork carrier 3 are also conceivable.

Figure 2:
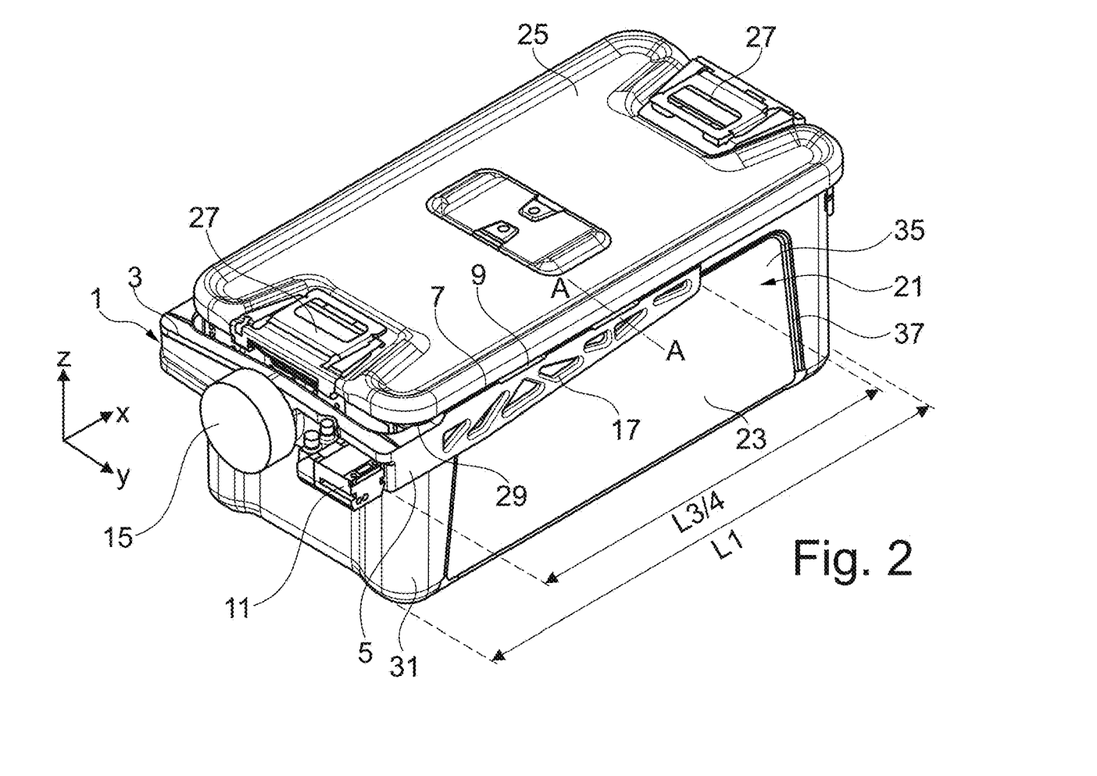
FIG. 2 is a representation of a system comprising the handling tool according to the first configuration example and a first sterile goods container.

FIG. 2 shows a system comprising the handling tool 1 according to the disclosure according to the first configuration example and a medical container in the form of a sterile goods container 21. The sterile goods container 21 includes a trough 23 and a lid 25. The trough 23 and the lid 25 are detachably connected to each other via the closure 27. In other words, the lid 25 closes the trough 23 of the sterile goods container 21. The handling tool 1 is provided and configured to receive the sterile goods container 21 between the two fork arms 5 and to automatically grip and handle the sterile goods container 21.

The sterile goods container 21 shown in FIG. 2 is a full-format or 1/1 sterile goods container 21. The full-format sterile goods container 21 has a length L1 in the longitudinal direction X. The fork arms 5 have a length L3/4 in the longitudinal direction X. The fork arms 5 have a length L3/4 in the longitudinal direction X. The length L3/4 of the fork arms 5 corresponds to three quarters of the length L1 of the full-size sterile goods container 21.

An end stop 29 is configured on an end portion of the fork arm 5 facing the fork carrier 3 (see also FIG. 1). The end stop 29 is a partially spherical/curved recess, wherein a radius of the end stop 29 essentially corresponds to a corner radius of a corner 31 of the trough 23 of the sterile goods container 21.

The handling tool 1 engages with the receiving projections 7 in a fold 33 of the trough 23 of the sterile goods container 21, which is explained in more detail below in FIG. 3 using section A-A in FIG. 2.

Figure 3:
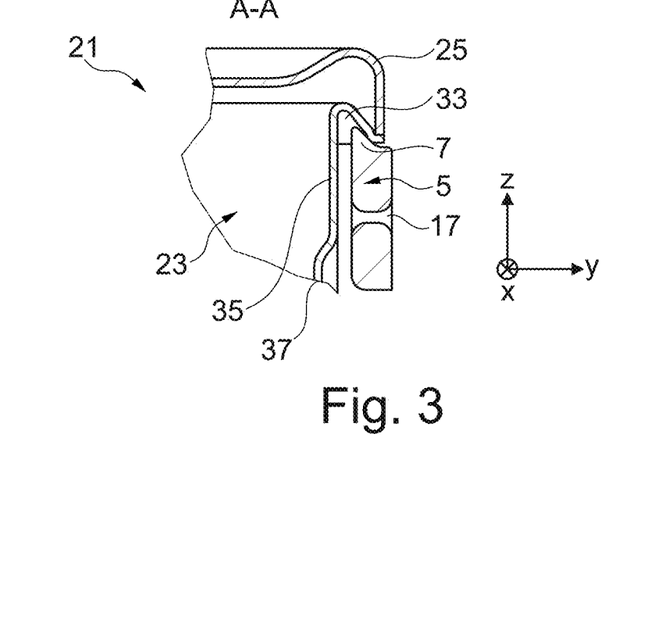
FIG. 3 is a sectional view of section A-A from FIG. 2.

FIG. 3 shows section A-A and thus a partial section through the system shown in FIG. 2. Specifically, FIG. 3 shows a section through the fork arms 5 with the receiving projections 7 and an edge portion of the sterile goods container 21 with the trough 23 and the lid 25. The trough 23 contains the fold 33, which is configured in parallel at an opening edge of the trough 23 at least at two opposing side walls 35 of the trough 23. In the first configuration example shown here, the fold 33 is configured in one piece of material with the side wall 35 and the fold 33 and the side wall 35 form an acute angle.

A wall thickness of the side wall 35 and of the fold 33 is constant/identical in the configuration example shown here. However, embodiments are conceivable in which the wall thickness of the fold 33 is greater than the wall thickness of the side wall 35. In the first configuration example shown here, the side wall 35 is configured with a stiffening beading/stiffening structure 37 (see also FIG. 2).

The receiving projections 7 are geometries that narrow with increasing height in the height direction Z in relation to an extension in the width direction Y. In other words, the receiving projections 7 are ramp-shaped geometries that rise in the direction of the axis M (see FIG. 1). In yet other words, a receptacle for medical containers or for the sterile goods container 21 is configured between the two fork arms 5 and the height of the receiving projections 7 increases in the height direction Z toward the receptacle.

In the first configuration example shown here, a pitch of the receiving projections 7 is matched to the angle of the fold 33. In other words, the receiving projections 7 of the fork arms 5 contact the fold 33 of the sterile goods container 21 when the sterile goods container 21 is located in the receptacle of the handling tool 1.

In the following, a mode of operation of the handling tool 1 in combination with the full-format sterile goods container 21 is described with reference to FIG. 2 and FIG. 3. In order to handle the sterile goods container 21 and to perform pick-and-place tasks, the handling tool 1 is moved in the longitudinal direction X via a robotic system (not shown), which is connected to the handling tool 1 via the interface 15, until the sterile goods container 21 rests against the end stop 29. The position of the sterile goods container 21 at the end stop 29 can be checked/validated using the sensor 11, for example.

Furthermore, the sensor 11 may read a tag (not shown) attached to the sterile goods container 21. The tag may, for example, contain information about the contents of the sterile goods container 21. Furthermore, the sensor 11 may be provided and configured to read tags that are attached in/on a rack and/or on a container transport cart and contain, for example, information about a storage location.

When the sterile goods container 21 is at the end stop 29, the movement of the handling tool 1 in the longitudinal direction X is stopped and the handling tool 1 is moved in the positive height direction Z. The receiving projections 7 of the fork arms 5 are brought into engagement/form-fit with the fold 33 of the sterile goods container 21 and the sterile goods container 21 is lifted. In other words, the sterile goods container 21 is inserted into the handling tool 1 in a vertical, translatory movement of the handling tool 1 so that the sterile goods container 21 sits with the fold 33 in an upper region between the fork arms 5 in the receptacle. This ensures a form-fitting, defined fit of the sterile goods container 21 to be transported. Furthermore, even when inserted, the sterile goods container 21 stabilizes the fork arms 5 with regard to lateral movement.

If the sterile goods container 21 is connected to the handling tool 1 in this form-fitting manner via the receiving projections 7 of the fork arms 5, the handling tool 1 can be moved via the robotic system and the sterile goods container 21 can be repositioned. In order to set down the sterile goods container 21, the handling tool 1 moves further in the negative height direction Z as soon as the sterile goods container 21 stands on a surface and the receiving projections 7 and the fold 33 are disengaged, thus releasing the form-fittingly defined seat.

Figure 4:
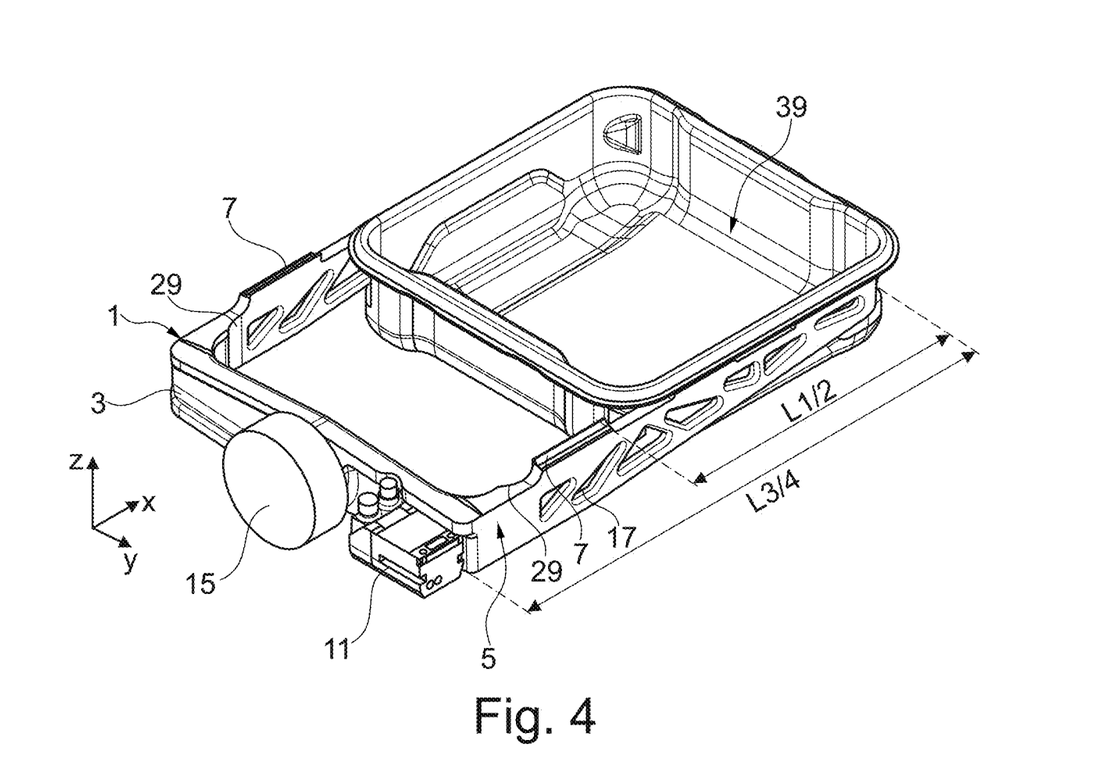
FIG. 4 is a representation of a system comprising the handling tool according to the first configuration example and a half-format container trough in a first position.
Figure 5:
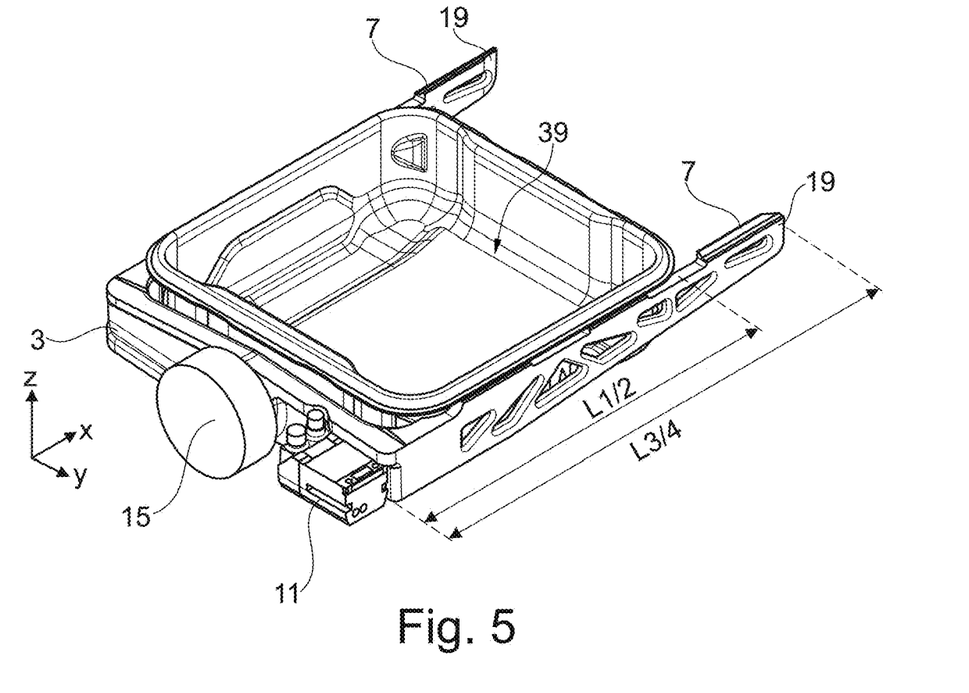
FIG. 5 is a representation of the system comprising the handling tool according to the first configuration example and the half-format container trough in a second position.

FIG. 4 and FIG. 5 show the handling tool 1 according to the first configuration example with a medical container in the form of a half-format container trough 39. A repeated description of the handling tool 1 according to the first configuration example is dispensed with and only differences in the mode of operation of the handling tool 1 in combination with the half-format container trough 39 are described below with reference to FIG. 4 and FIG. 5.

In order to be able to handle the half-format container trough 39 safely, it is necessary to bring the half-format container trough 39 into contact with the end stop 29. Since the length L3/4 of the fork arms 5 is longer than a length L1/2 of the half-format container trough 39 when handling the half-format container trough 39, this is not readily possible if the half-format container trough 39 is positioned against an obstacle in such a way that the fork arms 5 cannot move so far in the longitudinal direction X that the half-format container trough 39 is in contact with the end stop 29.

FIG. 4 shows a first step in which the half-format container trough 39 gets/is lifted with a front portion of the handling tool 1. The corner portions/corner radii of the half-format container trough 39 are arranged in the notches 9 in order to prevent a collision between the fork arms 5 and the corner radii of the half-format container trough 39 and at the same time to form a defined stop in the longitudinal direction X for the half-format container trough 39 in the fork arms 5. In this first step, the half-format container trough 39 can be placed away from the obstacle via the handling tool 1 in such a way that the fork arms 5 can move in the longitudinal direction X in a second step until the half-format container trough 39 is in contact with the end stop 29, as shown in FIG. 5.

In a specific example, the half-format container trough 39, which is located in a second row in a rack and/or container transport cart, can thus be lifted with the front portion/with the tip of the handling tool 1 and can be positioned further forward in the rack (first step). The half-format container trough 39 can then be lifted again with the rear part of the handling tool 1 when the fork arms 5 protrude beyond the half-format container trough 39 (second step). This has the advantage that the medical container, regardless of its size, can be moved to the interface 15 of the robotic system with the smallest possible lever arm and the maximum load-bearing capacity of the robotic system can be utilized as well as possible.

Second Configuration Example

Figure 6:
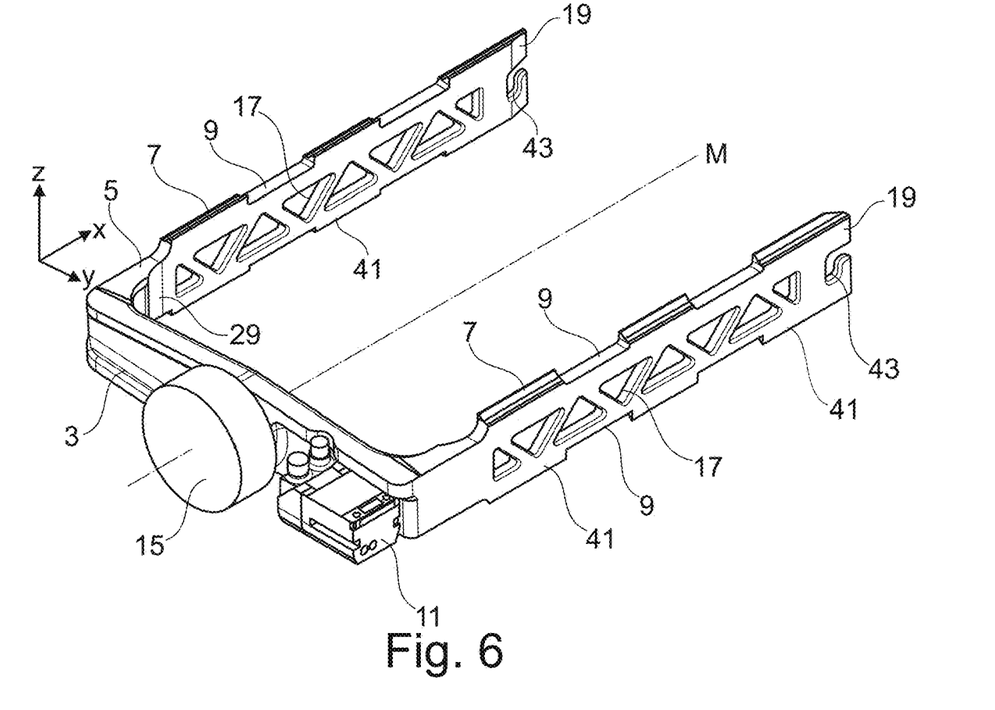
FIG. 6 is a representation of the handling tool according to a second configuration example of the present disclosure.

FIG. 6 shows a perspective view of a handling tool 1 according to the disclosure in a second configuration example. A repeated description of features and properties identical to the first configuration example is dispensed with below and only differences to the first configuration example are discussed.

The handling tool 1 according to the second configuration example includes manipulation projections 41 on the underside of the fork arms 5. The underside is understood to be the side of the fork arm 5 facing away from the upper side. In other words, the manipulation projections 41 and the receiving projections 7 are configured on sides of the fork arm 5 that face away from each other. The manipulation projections 41 are interrupted by the notches 9 corresponding to the receiving projections 7. In other words, the notches 9 are arranged identically on the underside and on the upper side of the fork arm 5. The exact geometry of the manipulation projections 41 will be explained in more detail later with reference to FIG. 8.

Latching elements in the form of hooks 43 are also configured on the end portion of the fork arms 5 facing away from the fork carrier 3. The hook 43 is configured to engage form-fittingly in eyelets or handles or the like attached to objects and to move the object. FIG. 6 shows the handling tool 1 in a receiving position. In the receiving position, the receiving projections 7 point upward or in the positive height direction Z.

Figure 7:
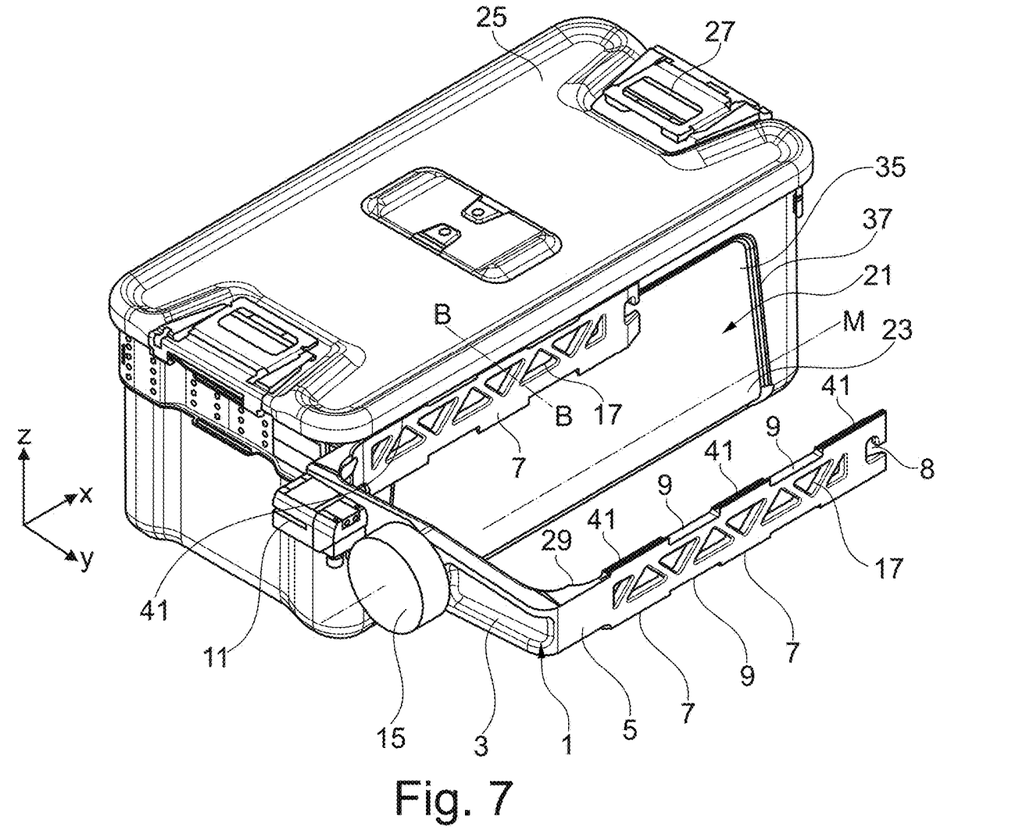
FIG. 7 is a representation of a system comprising the handling tool according to the second configuration example and the first sterile goods container.

FIG. 7 shows the handling tool 1 of the second configuration example in a manipulation position. Specifically, in the manipulation position, the handling tool 1 is rotated by 180° around the central axis M, so that the manipulation projections 41 now point upward or in the positive height direction Z. In other words, the receiving position and the manipulation position differ in a rotation of the handling tool 1 around the center axis by 180°. The rotation of the handling tool 1 takes place via the interface 15 or a rotation unit flanged to the interface 15. One of the fork arms 5 is engaged with the manipulation projections 41 with the fold 33 of the container trough 39 of the sterile goods container 21. The exact mode of operation will be explained in more detail later with reference to FIG. 9 to FIG. 11.

Figure 8:
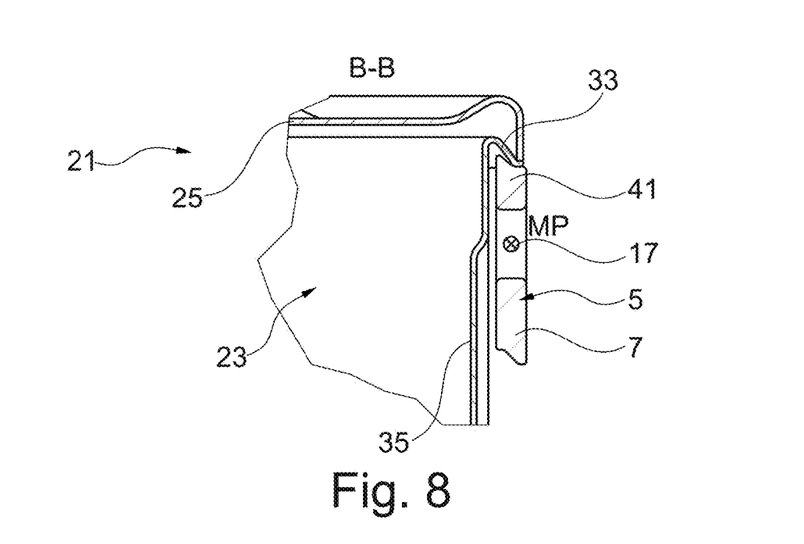
FIG. 8 is a sectional view of section B-B from FIG. 7.

FIG. 8 shows a section B-B from FIG. 7. The manipulation projection 41 engages in the fold 33 in a form-fitting manner. In the manipulation position shown here, the receiving projection 7 is configured on a portion of the fork arm 5 facing away from the fold 33. The manipulation projection 41 and the receiving projection 7 are configured point-symmetrically with respect to a fork arm axis MP, which extends in the longitudinal direction X of the fork arm 5. In other words, the contour of the manipulation projection 41 corresponds to the contour of the receiving projection 7. In yet other words, the manipulation projection 41 differs from the receiving projection 7 essentially in its orientation on the fork arm 5.

Figure 10:
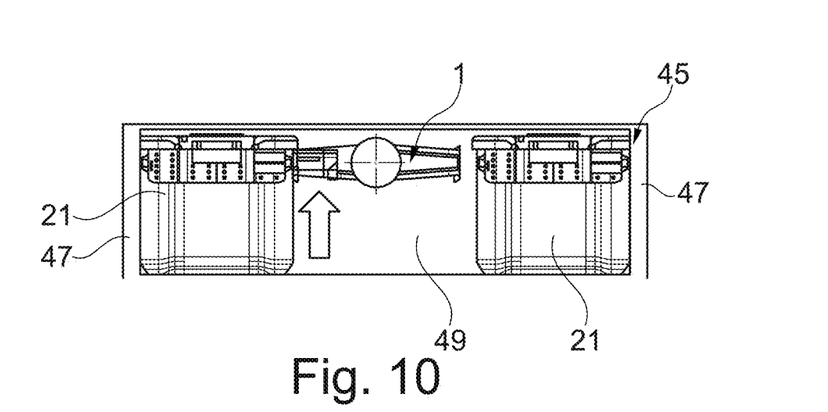
FIG. 10 is a representation of a rack compartment of the exemplary rack and the handling tool according to the second configuration example in a first handling step.
Figure 11:
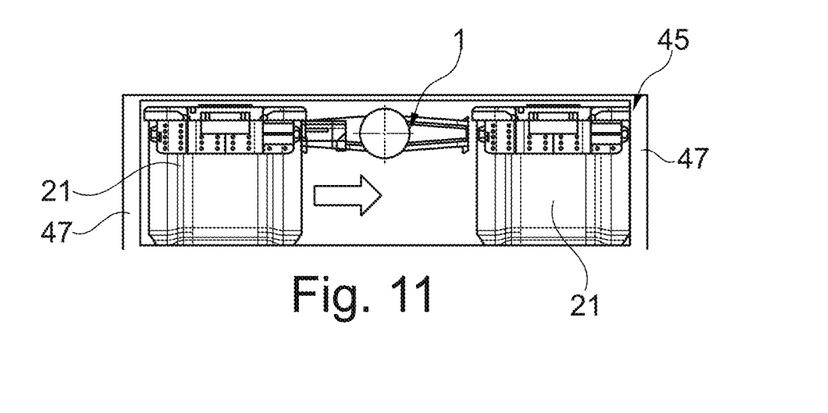
FIG. 11 is a representation of the rack compartment of the exemplary rack and the handling tool according to the second configuration example in a second handling step.

In the following, an exemplary mode of operation of the handling tool 1 of the second configuration example is described with reference to FIG. 9 to FIG. 11.

Figure 9:
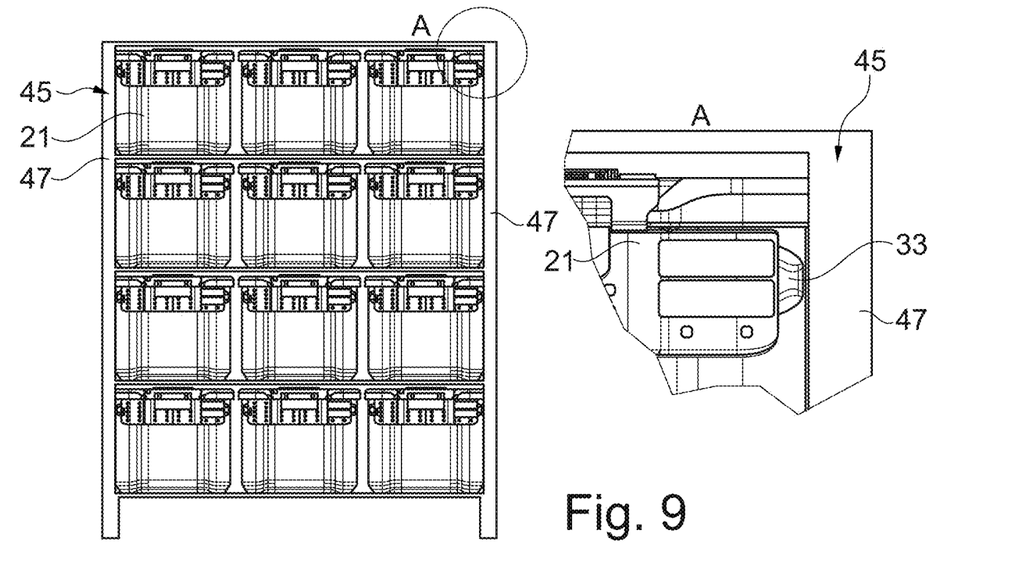
FIG. 9 is a representation of an exemplary rack with a plurality of first sterile goods containers.

FIG. 9 shows an exemplary rack 45, which is (fully) occupied by a large number of sterile goods containers. Enlargement A shows that the fold 33 of the sterile goods container 21 is positioned so close to a wall 47 of the rack 45 that the handling tool 1 cannot engage in the fold 33.

In a first step (not shown), a sterile goods container 21 positioned in the center of the rack is lifted out of the arrangement in the rack 45 as described above and is handled. After a clearance 49 has been created by removing the central sterile goods container 21 in the rack 45, the handling tool 1 moves into the clearance 49 in the manipulation position in a second step and the manipulation projections 41 are brought into engagement with the fold 33 of the sterile goods container via a horizontal and a subsequent vertical movement in a third step (see FIG. 10). With a subsequent further horizontal movement, the sterile goods container 21 hooked in by the handling tool 1 is displaced/moved away from the side wall 47 in a fourth step. The handling tool 1 is then rotated into the receiving position and the sterile goods container 21 is (regularly) picked up.

LIST OF REFERENCE SIGNS 1 handling tool
3 fork carrier
5 fork arms
7 receiving projection
9 notch
11 sensor
13 sensor recess
15 interface
17 recess
19 chamfer
21 sterile goods container
23 trough
25 lid
27 closure 29 end stop
31 corner
33 fold
35 side wall
37 stiffening beading/stiffening structure
39 container trough
41 manipulation projection
43 hook
45 rack
47 wall
49 clearance
X longitudinal direction
Y width direction
Z height direction
M axis
MP fork arm axis

The invention claimed is:

1. A handling tool, which is provided and configured for gripping and/or handling medical equipment, having a fork carriage and two parallel-spaced fork tines extending in a longitudinal direction at right angles away from the fork carriage, each of which has a container support/capturing side on which a number of receiving protrusions that are longitudinally spaced are formed or arranged, which extend in a height direction to the container support/capturing side, wherein each of the two parallel-spaced fork tines includes a lower side which faces away from the container support/capturing side, each lower side comprising manipulation projections attached to and extending from the lower side in a depth direction/negative height direction to the lower side.

2. The handling tool according to claim 1, wherein the receiving protrusions of the two parallel-spaced fork tines are tapered in such a way that a height extension of the receiving protrusions in the height direction on sides of the two parallel-spaced fork tines facing each other is greater than a height extension of the receiving protrusions in the height direction on sides of the two parallel-spaced fork tines facing away from each other.

3. The handling tool according to claim 2, wherein the manipulation projections are tapered in such a way that a height extension of the manipulation projections in the height direction on the sides of the two parallel-spaced fork tines facing each other is smaller than a height extension of the manipulation projections in the height direction on the sides of the two parallel-spaced fork tines facing away from each other.

4. The handling tool according to claim 3, wherein the manipulation projections are rotationally symmetrical to the receiving protrusions, relative to a center axis of the two parallel-spaced fork tines extending in the longitudinal direction of the two parallel-spaced fork tines.

5. The handling tool according to claim 1, wherein the handling tool includes a sensor receptacle.

6. The handling tool according to claim 1, wherein a distance between the two parallel-spaced fork tines is variable.

7. The handling tool according to claim 1, wherein at least one of the two parallel-spaced fork tines is formed with at least one clamping element.

8. The handling tool according to claim 1, wherein the two parallel-spaced fork tines have a truss structure.

9. The handling tool according to claim 1, wherein the fork carriage includes an interface of a robotic system on a portion facing away from the two parallel-spaced fork tines.

10. A system comprising:
the handling tool according to claim 1; and
a medical container,
wherein the medical container contains a fold and the two parallel-spaced fork tines are provided and configured to contact and/or fix the fold of the medical container in a form-fitting manner via the receiving protrusions and/or to engage in the fold.

11. The system according to claim 10, wherein the medical container has a base area with dimensions A×B and A is a multiple of 1/3 of a length of the two parallel-spaced fork tines in the longitudinal direction.

12. The handling tool according to claim 1, wherein the receiving protrusions are wedge-shaped.

13. The handling tool according to claim 1, wherein the manipulation projections are wedge-shaped.

14. The handling tool according to claim 1, wherein the manipulation projections are rotationally symmetrical by 180° to the receiving protrusions.

15. The handling tool according to claim 1, wherein the handling tool comprises a sensor receptacle in/on the fork carriage.

16. The handling tool according to claim 1, wherein at least one of the two parallel-spaced fork tines includes a hook at an end portion facing away from the fork carriage.

17. The handling tool according to claim 1, wherein at least one of the two parallel-spaced fork tines is formed with at least one clamping element that comprises a pneumatic or hydraulic cushion.

18. A handling tool, which is provided and configured for gripping and/or handling medical equipment, having a fork carriage and two parallel-spaced fork tines extending in a longitudinal direction at right angles away from the fork carriage, each of which has a container support/capturing side on which a number of receiving protrusions that are longitudinally spaced are formed or arranged, which extend in a height direction to the container support/capturing side, wherein the two parallel-spaced fork tines include a lower side which faces away from the container support/capturing side and on which manipulation projections are formed or arranged which extend in a depth direction/negative height direction to the lower side,
wherein the manipulation projections are rotationally symmetrical to the receiving protrusions, relative to a center axis of the two parallel-spaced fork tines extending in the longitudinal direction.

19. A handling tool, which is provided and configured for gripping and/or handling medical equipment, having a fork carriage and two parallel-spaced fork tines extending in a longitudinal direction at right angles away from the fork carriage, each of which has a container support/capturing side on which a number of receiving protrusions that are longitudinally spaced are formed or arranged, which extend in a height direction to the container support/capturing side, wherein the two parallel-spaced fork tines include a lower side which faces away from the container support/capturing side and on which manipulation projections are formed or arranged which extend in a depth direction/negative height direction to the lower side,
wherein at least one of the two parallel-spaced fork tines includes a latching element at an end portion facing away from the fork carriage.

* * * * *